March 17, 1970    A. F. DANIELL    3,500,648
UNDERWATER VEHICLES
Filed April 15, 1968    7 Sheets-Sheet 2
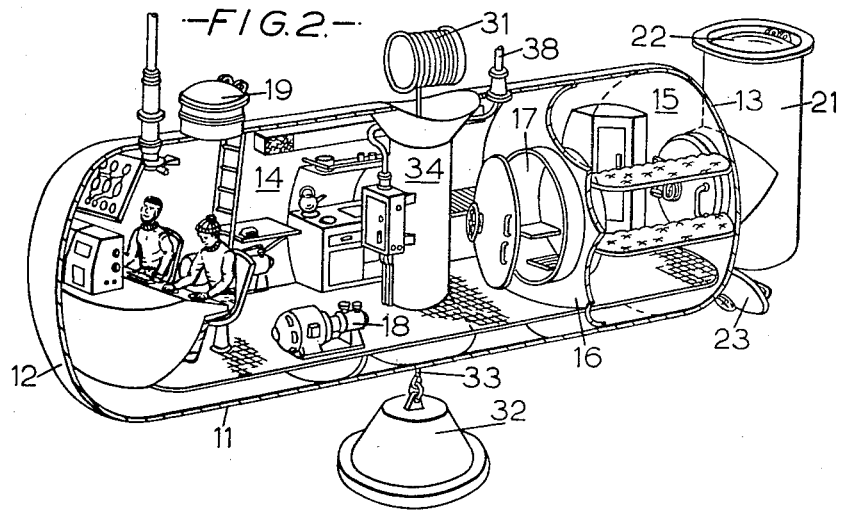
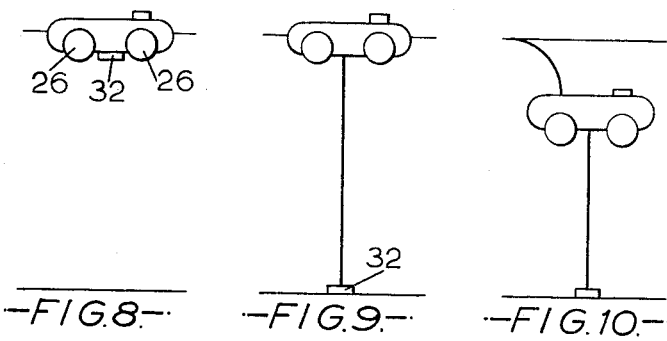
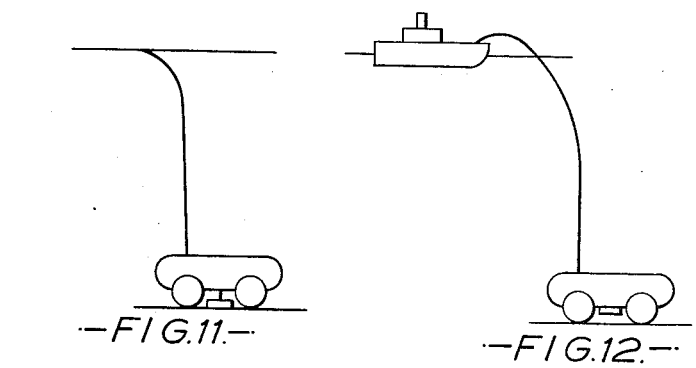
INVENTOR:
ALAN F. DANIELL
BY
*Louise & Smiley*
Attys.

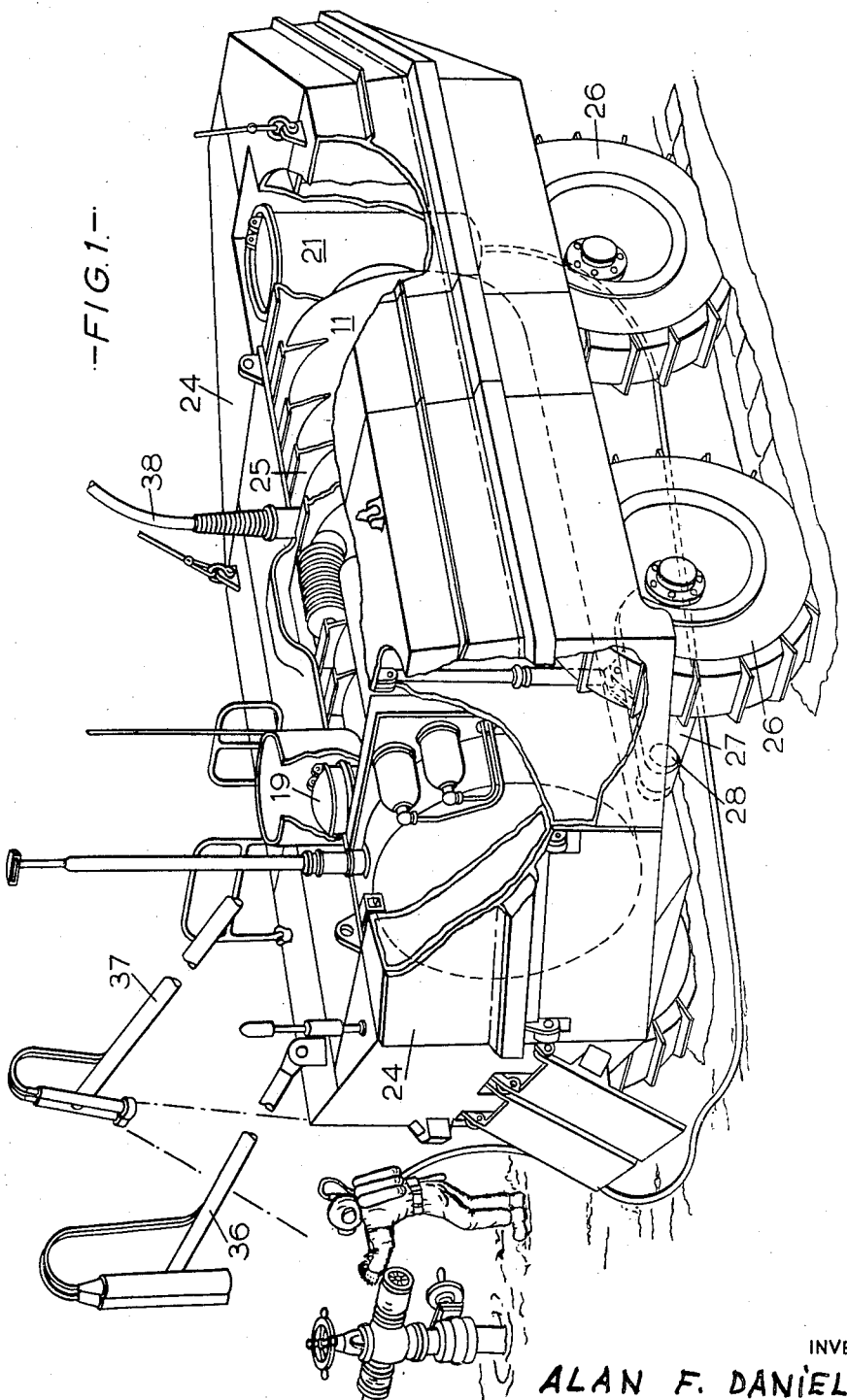

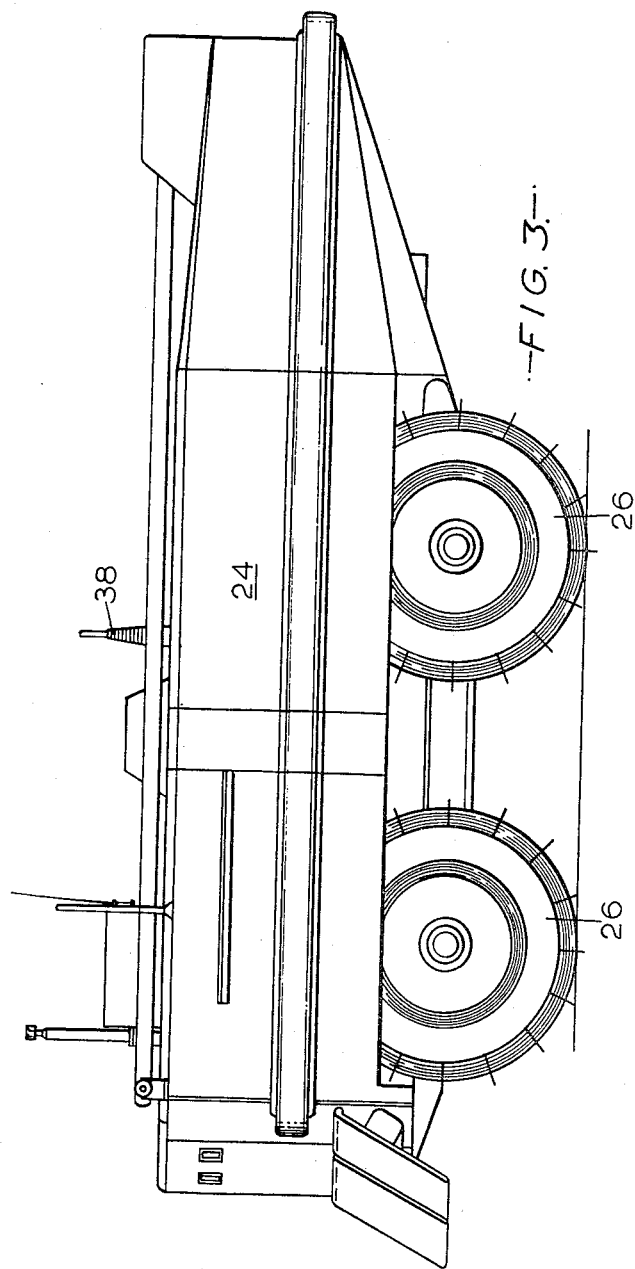

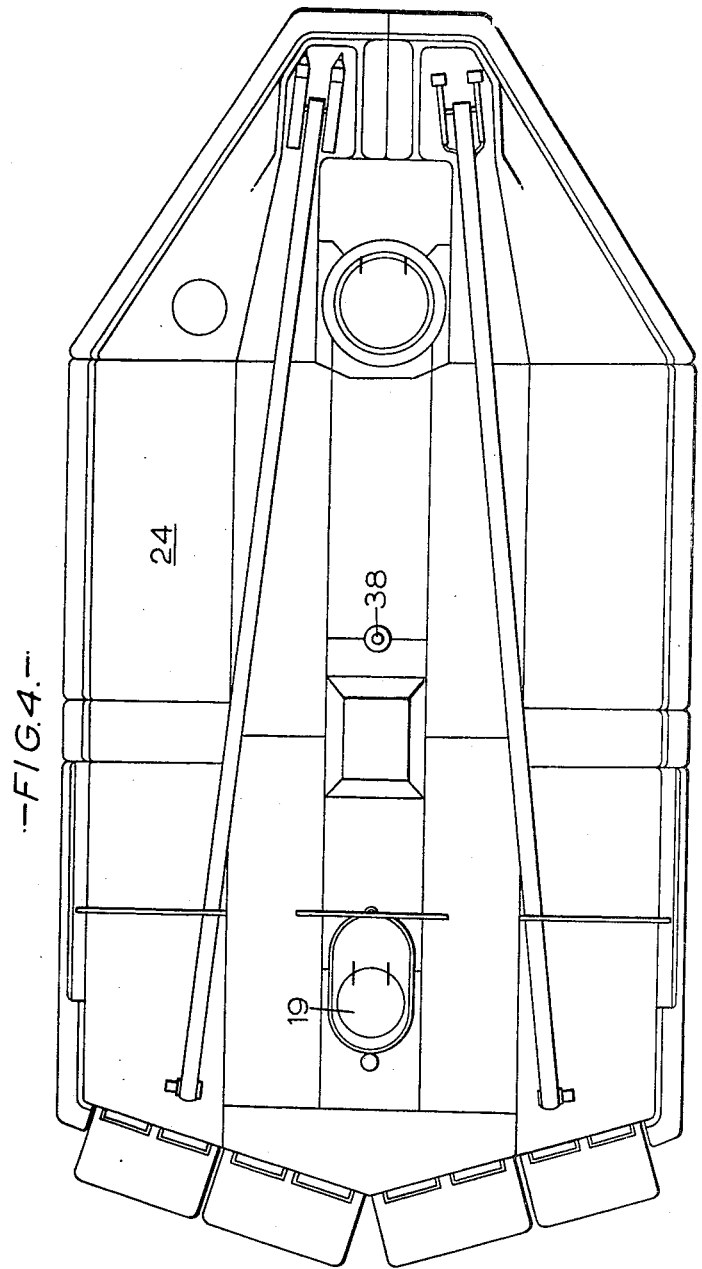

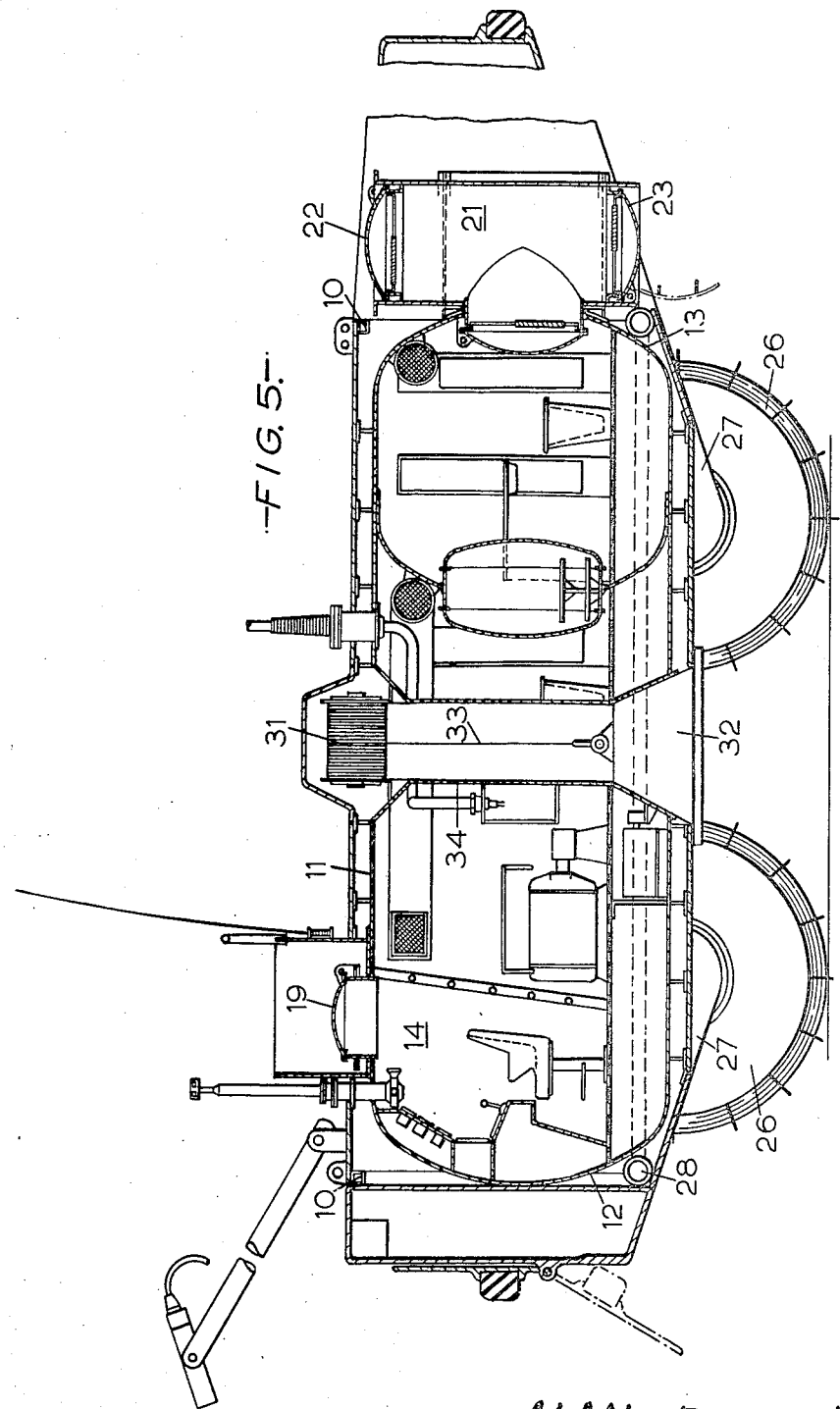

March 17, 1970 A. F. DANIELL 3,500,648
UNDERWATER VEHICLES
Filed April 15, 1968 7 Sheets-Sheet 6
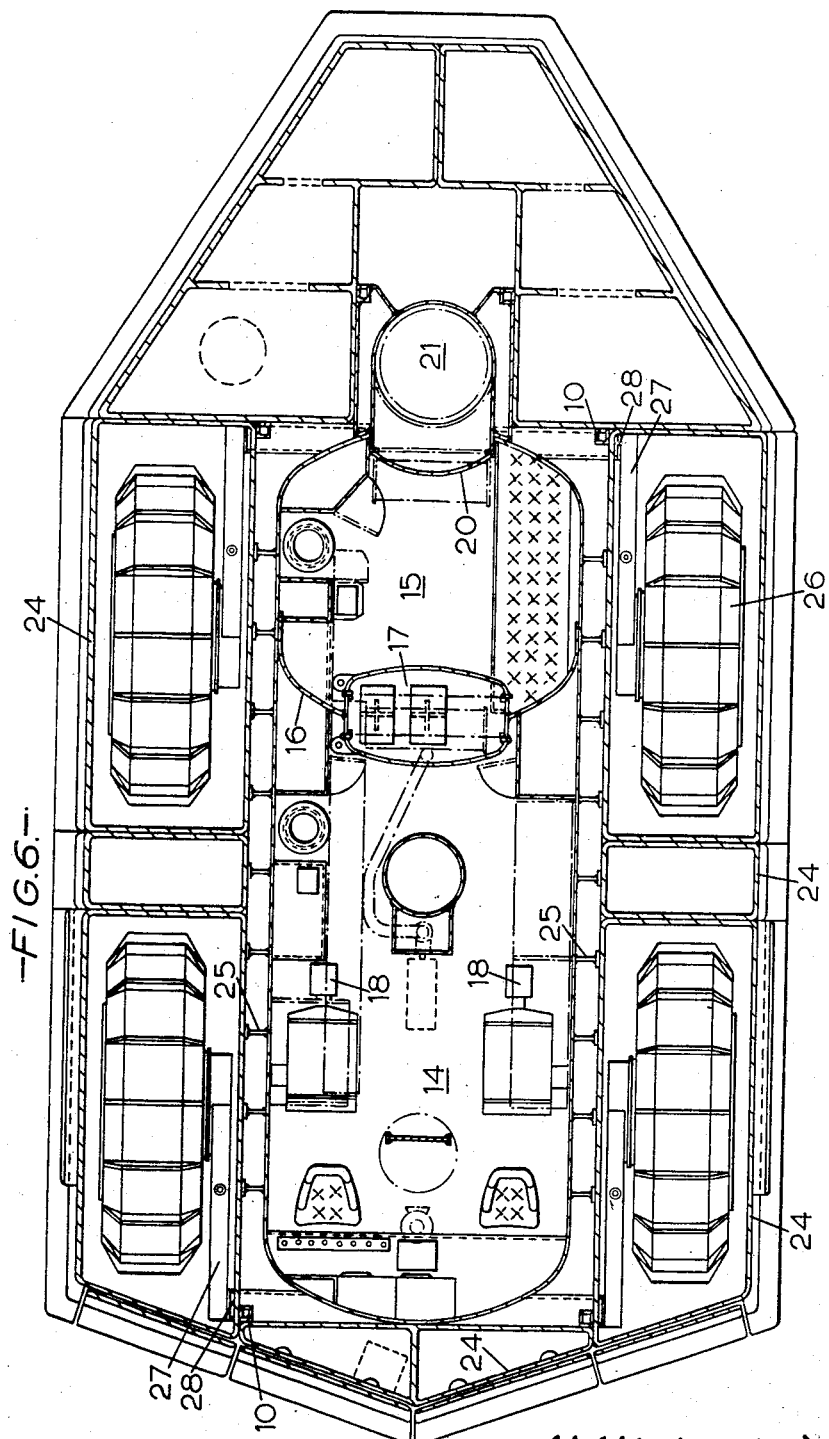
INVENTOR:
ALAN F. DANIELL
BY March 17, 1970　　　A. F. DANIELL　　　3,500,648
UNDERWATER VEHICLES
Filed April 15, 1968　　　　　　　　　　7 Sheets-Sheet 7
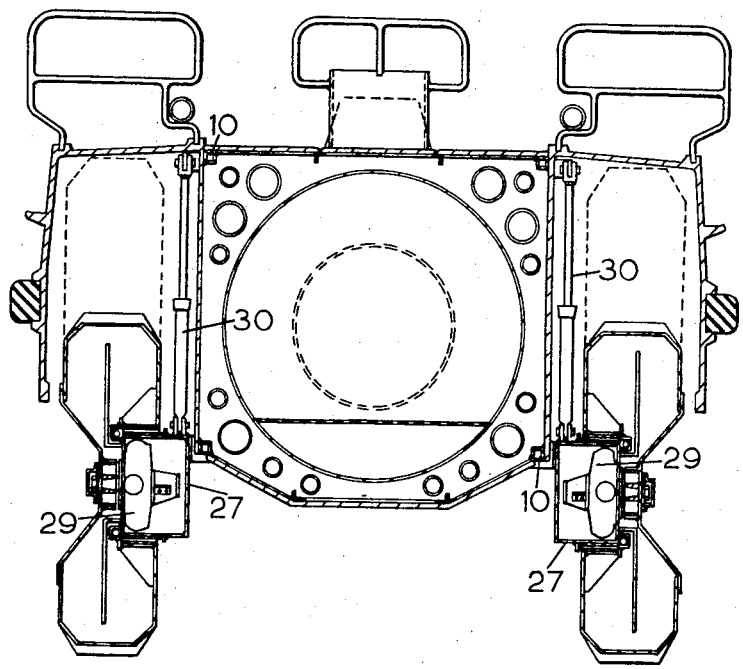
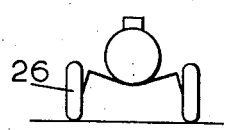 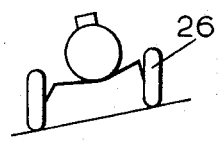
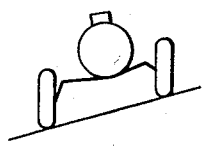 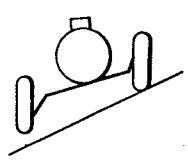
INVENTOR:
ALAN F. DANIELL
BY United States Patent Office 3,500,648
Patented Mar. 17, 1970

3,500,648
UNDERWATER VEHICLES
Alan F. Daniell, Birkenhead, Cheshire, England, assignor to Cammell Laird & Company (Shipbuilding & Engineers), Limited, Birkenhead, Cheshire, England, a British company
Filed Apr. 15, 1968, Ser. No. 721,317
Int. Cl. B63c *11/34*
U.S. Cl. 61—69                                    14 Claims

ABSTRACT OF THE DISCLOSURE

The underwater vehicle having a buoyant body or hull is mounted on wheels having, or adapted to be given preponderant weight, when the vehicle is submerged, so that the vehicle will travel over the seabed. The mounting of the buoyant hull on the wheels is such as to provide for limited relative movement between the hull and the wheels. The vehicle may include a winch on the hull, a heavy weight or sinker suspended from the hull by a rope of said winch and adapted to be lowered by the latter onto the seabed and raised therefrom, and means for flooding the wheels of the vehicle to reduce its buoyancy whereby, when the sinker is on the seabed it is effective as an anchorage to enable the vehicle to be winched down to the seabed by the winch. Following the winching-down of the vehicle onto the seabed the heavy weight or sinker may be clamped to the hull so that its weight is added thereto to keep the vehicle on the seabed and render it mobile. Subsequently, when it is desired to surface the hull, the weight or sinker is released onto the seabed and the hull is allowed to rise under the control of the winch. Water ballast in the wheels of the vehicle may then be blown and the sinker recovered. In one particular arrangement the hull has four wheels each of which is mounted on an arm or lever pivotally attached to the hull and capable of rising and falling between limits defined by stops on the hull. Each wheel may have in its hub a hydraulic driving motor.

---

This invention is for improvements in or relating to underwater vehicles capable of travelling over the seabed.

A vehicle according to the present invention has many applications in the field of underwater survey, inspection and other underwater activities in that it will serve, for example, as a mobile base for diving operations, a mobile chamber from the interior of which external equipment can be manipulated or as a mobile inspection station.

In particular a vehicle according to the present invention meets an urgent requirement in the field of offshore petroleum exploitation which involves various activities on or in the vicinity of the seabed such as, for example, pipeline inspection and repair.

According to the present invention there is provided an underwater wheeled vehicle comprising a buoyant body or hull, a wheel or wheels having or adapted to be given preponderant weight, when the vehicle is submerged, and means mounting the buoyant body or hull on said wheel or wheels and adapted to provide for limited relative movement between the body or hull and the wheel or wheels.

In one preferred embodiment of the invention the underwater wheeled vehicle comprises a buoyant body or hull, a winch on said body or hull, a heavy weight or sinker suspended from said buoyant body or hull by a rope or cable of said winch and adapted to be lowered by the latter onto a seabed and raised therefrom, means for flooding a part of the vehicle to reduce its buoyancy whereby when the sinker is on the seabed it is effective as an anchorage to enable the vehicle to be winched down to the seabed by said winch, and wheels attached to said body or hull by means which permit them to rise and fall independently relatively to the hull.

The wheels are heavy or are capable of being made heavy, e.g. by flooding.

In one particular embodiment of the invention the hollow body or hull has four wheels, each of which is mounted on an arm or lever pivotally attached to the hull and capable of rising and falling between limits defined by stops on the hull. Preferably each wheel has its own driving motor which may take the form of a hydraulic motor of the capstan type, i.e. the type adapted to be incorporated in the hub of the wheel. Following the winching down of the vehicle onto the seabed the heavy weight or sinker may be clamped to the hull so that its weight is added thereto to keep the vehicle on the seabed and render it mobile. Subsequently, when it is desired to surface the hull, the weight or sinker is released onto the seabed and the hull allowed to rise under the control of the winch. The water ballast in the wheels of the vehicle is then blown and the sinker recovered.

The invention will be further described, by way of example, with reference to the accompanying diagrammatic drawings in which:

FIGURE 1 is a perspective view of the seabed vehicle with part of the outer shell broken away to show the interior construction, FIGURE 2 is a perspective view of the interior structure of the vehicle with the wall or shell broken away to show interior fittings and apparatus, FIGURE 3 is a side elevation of the vehicle, FIGURE 4 is a plan view of the vehicle, FIGURE 5 is a sectional elevation, FIGURE 6 is a sectional plan view, FIGURE 7 is a typical cross-sectional view, FIGURES 8 to 12 inclusive show the procedure of putting the vehicle into operation, and FIGURES 13 to 16 inclusive show how the vehicle maintains stability even when travelling over steeply inclined portions of the seabed.

The vehicle comprises a rectangular outer frame built up of hollow steel sections 10 and an internal cylindrical pressure hull 11 having dished ends 12 and 13. The hull 11 is enclosed within an outer hull consisting of a series of hollow boxes 24 of fibre-glass-reinforced plastics material, bolted to the frame members 10. The pressure hull 11 is stiffened by ribs 25 secured to the members 10.

The hull 11 is divided into two compartments 14 and 15 by a pressure bulkhead 16. The latter is fitted with an air lock 17 which provides for the passage of personnel between the compartments 14 and 15.

The forward compartment 14 is an isobaric chamber which accommodates the operating crew and observers and contains electrically driven hydraulic pumps 18, which constitute the main power source, the necessary control gear and instruments, television camera monitors and sonar display. Cooking and toilet facilities are also provided. This compartment will normally be held at atmospheric pressure. An access hatch 19 is provided to the chamber 14.

The rear compartment 15 is a hyperbaric chamber and is furnished with bunks and lockers for diving gear and also contains cooking and toilet facilities. It is provided with equipment whereby it can be maintained at any desired pressure and atmospheric composition.

The vehicle is provided with air purification apparatus and may also be designed to carry a number of oxygen and air bottles.

A pressure hatch 20 in the end 13 of the chamber 15 ommunicates with a transfer chamber 21. The latter is tted with hatches 22 and 23 at top and bottom respectively. The lower hatch 23 gives divers access to the seaed. The upper hatch 22 may be designed to lock onto a eparate small mobile decompression chamber for transer of diving personnel. The hatch 22 may also be used or escape if the vehicle has to be abandoned in an emerency.

When submerged the vehicle travels on four large /heels 26 consisting of hollow water-tight drums rotating bout cylindrical hubs. The hubs are carried on swinging nks 27 pivotally attached to the main frame 10 of the uter hull at 28. Provision is made for flooding or blowng (i.e. discharging water from) the interior spaces /ithin the wheels 26. The wheels are driven independently y low speed hydraulic motors 29 mounted within their ubs.

The movement of the swinging links 27 of the suspenion system for the wheels 26 is controlled by hydraulic ams 30 which can also lock the suspension when the veicle is stationary and retract the wheels into recesses in he outer hull when the vehicle is surfaced.

A hydraulically driven winch 31 is mounted centrally n the vessel and carries a heavy sinker 32 which may be loused in a recess in the lower part of the hull. The wire ope 33 of the winch passes through a cylindrical trunk 4 running vertically through the centre of the pressure ull.

Television cameras and underwater lighting clusters are arried on two separate booms 36 and 37 which can be aised, lowered and slewed and are housed on deck when ot in use. The forward compartment 14 is also provided vith a periscope.

The electric motors driving the pumps 18 receive their lectricity supply via a buoyant trailing cable 38 from a ervice vessel or tender on the surface.

Steering of the vehicle is accomplished by locking or raking the wheels on one side and driving those on the ther.

The vehicle above described is designed to provide faillities for observation, recognisance and engineering asks at or near the seabed in water depths of up to, say, i00 feet. It is not intended that the vehicle should float reely when submerged but that it should be supported y and travel on the seabed. Thus, it is not subject to the onstraints on weight, volume, power and mission duraion which limit the capabilities of small free-swimming ubmersibles. Furthermore, it has been designed to proide comfortable accommodation for crew and observers vith a large payload capacity and adequate power suplies to operate heavy mechanical equipment. It can be naintained on location indefinitely.

When the vehicle is floated, e.g. being towed to its location, the sinker or ballast weight 32 is clamped to and elow the hull (see FIGURE 5) and, the wheels 26 being mpty, the total weight of the vehicle is substantially less han the submerged displacement. For example, the total veight may be 26 tons (including the weight of a 6-ton inker) against a submerged displacement of 37 tons.

After towing (FIGURE 8) the vehicle to the work site FIGURE 9) the sinker 32 is lowered by the winch 31 nto the seabed and the wheels 26 are allowed to flood. n this condition the vehicle is winched down (see FIGURE 10) against a net buoyancy of, say, 2 tons. On reachng the seabed (FIGURE 11) the sinker is hauled up tight gainst the hull and clamped thereto as shown in FIG-JRE 12. The vehicle is now operative to be driven over he seabed.

When the vehicle is operating on the seabed the hollow wheels, being flooded, have a preponderant weight of, say 1½ tons each while the hull is buoyant to the extent of about 2 tons and has its centre of buoyancy above its centre of gravity. The net weight preponderance of the whole vehicle is thus in the region of 4 tons assuming a total weight of 26 tons when floating on the surface with the sinker clamped below the hull.

The vehicle above described, particularly because of the suspension arrangements 27, 28, 30 for the wheels, has two great advantages.

Firstly, the vehicle is inherently stable. For example (see FIGURES 13 to 16), when proceeding along a sidelong slope of increasing severity the vehicle will at first tilt to follow the seabed and at increasing slopes will tilt less than the seabed. On a very steep slope (see FIGURE 16) the downhill wheels will tilt or "float" clear of the seabed and the vehicle will be supported stably and in a substantially upright condition by the two uphill wheels. Thus, in the absence of external forces the vehicle cannot overturn on any terrain. This feature is of particular importance since the driver of the vehicle will often be proceeding in conditions of poor visibility.

Secondly, the stability characteristic implies that if one or more wheels run onto soft ground and commence to sink reaction between these wheels and the ground is reduced and more load is thrown onto the remaining wheels on hard ground. Thus, the tendency of a land vehicle to become bogged down by throwing added weight onto a wheel in soft material is avoided and, in fact, reversed.

The wheels are very large (e.g. have a diameter of, say, 8 feet and a width of 3 feet) to permit the vehicle to traverse very soft seabed material since the wheels in effect obtain flotation from the weight of the seabed material displaced. This is a great advantage over a track vehicle which tends to dig deeply into the seabed even although the normal track pressure is small.

When it is required that the vehicle should ascend to the surface again the sinker 32 is unclamped (e.g. by operation of a clamping means from within the vehicle) and the vehicle rises to the surface under the control of the winch. Water ballast in the wheels is then blown and the vehicle is ready to be towed to another site. It will be noted that the ascent of the vehicle to the surface does not require the blowing of ballast but merely the lowering of the sinker from the vehicle to the seabed.

The electric power cable 38 may be designed to act as a towing hawser when the vehicle is on the surface, the arrangement being such that there is no strain on the cable where it enters the pressure chamber via a gland in the wall thereof. The cable 38 will include, in addition to power conductors, communication circuits and the like. The cable may be constructed so as to be slightly buoyant.

The vehicle above described will fulfill the following functions:

(1) Underwater survey and inspection using underwater television and photographic equipment operated by observers within the pressure hull 10. Seabed samples or core borings may be taken by externally mounted equipment controlled from within the hull.

(2) Construction or salvage work requiring heavy lifts, hydraulic or other powered crane, excavating or manipulating equipment being operated from within the hull and monitored by, for example, television equipment.

(3) As a base for diving operations where the effect of surface sea conditions needs to be obviated.

The provision of the compression chamber within the hull enormously increases the effective working capacity of divers.

It will be appreciated from what has just been stated that although a vehicle according to the invention is particularly suited to meet the urgent requirements of offshore petroleum exploitation, it will also be of great value in civil engineering and in salvaging and other underwater operations.

Means may be provided for adjusting the weight of the vehicle when it is on the seabed. For example, it may have tanks which can be flooded or blown as required.

I claim:

1. An underwater vehicle for travelling on the underwater bed comprising a buoyant hull, wheel means which have a preponderant weight when the vehicle is submerged and means mounting the buoyant hull on said wheel means and operative to provide for limited relative movement between the hull and the wheel means, means for flooding the wheel means of the vehicle to give it water ballast and reduce its buoyancy, and means for discharging such water ballast.

2. An underwater vehicle for travelling on an underwater bed comprising a buoyant hull, at least one wheel on each side of said hull and having such preponderant weight that the combination of hull and wheels has preponderant weight when the vehicle is submerged, the center of buoyancy of the whole vehicle being above its center of gravity, and means for mounting the buoyant hull on said wheels, said mounting means providing for limited free relative movement between the hull and the axis of the wheels and for limited free relative movement of the wheel on one side of the vehicle out of axial alignment with that on the other.

3. A vehicle as claimed in claim 2 wherein a winch is provided on the buoyant hull and a heavy weight is suspended from the buoyant hull by a rope of said winch whereby said heavy weight may be lowered by the winch onto the underwater bed and raised therefrom, means being provided for flooding a part of the vehicle thereby to reduce its buoyancy so that when the heavy weight is on the underwater bed it is operative as an anchorage to enable the vehicle to be winched down to the underwater bed by said winch.

4. A vehicle as claimed in claim 2 wherein each wheel of the wheel means is mounted on an arm pivotally attached to the buoyant hull and capable of rising and falling, between limits defined by stops, whereby said wheels can rise and fall independently relatively to the hull.

5. A vehicle as claimed in claim 2 wherein each wheel of the wheel means has its own hydraulic driving motor incorporated in it.

6. A vehicle as claimed in claim 2 wherein the buoyant hull is divided into compartments by a pressure bulkhead fitted with an air lock to provide for the passage of personnel between the compartments, one compartment serving as an isobaric chamber and the other as a hyperbaric chamber.

7. A vehicle as claimed in claim 2 wherein the buoyant hull is divided into compartments by a pressure bulkhead fitted with an air lock to provide for the passage of personnel between the compartments, one compartment being adapted to serve as an isobaric chamber and the other as a hyperbaric chamber, the hyperbaric chamber communicating with a transfer chamber having at its lower part a hatch to give access from the vehicle to the underwater bed and vice versa.

8. A vehicle as claimed in claim 2 wherein the buoyant hull comprises an inner hull enclosed within an outer hull consisting of a series of hollow boxes of fibre-glass-reinforced plastics material secured to a frame.

9. A vehicle as claimed in claim 2 wherein each wheel of the wheel means is in the form of a hollow watertight drum having a diameter in the region of 8 feet or more and a width in the region of 3 feet or more.

10. A vehicle as claimed in claim 2 wherein relative movement between the buoyant hull and the wheel means is controlled by hydraulic ram means.

11. A vehicle as claimed in claim 2 wherein a pressure fluid supply is provided by a pump driven by an electric motor within the vehicle, said electric motor being provided with an electricity supply via a buoyant cable.

12. A vehicle as claimed in claim 2 wherein means is provided for adjusting the weight of the vehicle when on the underwater bed.

13. An underwater vehicle for travelling on an underwater bed, comprising in combination:
a hull assembly having a net buoyancy when submerged and having its center of buoyancy above its center of gravity;
wheel means on each side of said hull assembly;
connecting means rigidly connecting the individual wheel means on each side of said hull assembly such hull assembly for disposition in selected fixed raised and lowered positions with respect thereto;
said wheel means having a total weight when submerged greater than said net buoyancy of the hull assembly so that the vehicle as a whole has a submerged net weight which acts downwardly to engage said wheel means against the underwater bed and supports the vehicle by reaction of the underwater bed against said wheel means and through said connecting means to said hull assembly; and
means for driving said wheel means to propel the vehicle along the underwater bed.

14. The underwater vehicle according to claim 2 wherein said hull assembly includes separate weight means and means for raising and lowering the weight means said vehicle having a net buoyancy when said weight means is lowered to rest upon the underwater bed which is less than the weight of said weight means so that the vehicle may be forcibly submerged by operating said means for raising and lowering in raising direction said weight means; and means for selectively increasing the net buoyancy of said vehicle to a value greater than the weight of said weight means so that the weight means may be recovered while the vehicle is surfaced.

References Cited

UNITED STATES PATENTS

| | | | |
|---|---|---|---|
| 650,758 | 5/1900 | Lake | 114— |
| 846,417 | 3/1907 | Lake | 114— |
| 3,082,975 | 3/1963 | Cardwell et al. | 61—69 |
| 3,388,683 | 6/1968 | Barhite et al. | 114— |

J. KARL BELL, Primary Examiner

U.S. Cl. X.R.

114—16; 115—1, 9